(No Model.) 2 Sheets—Sheet 2.
W. WALKER.
PROCESS OF AND APPARATUS FOR RECOVERING CARBON DIOXIDE.
No. 496,546. Patented May 2, 1893.
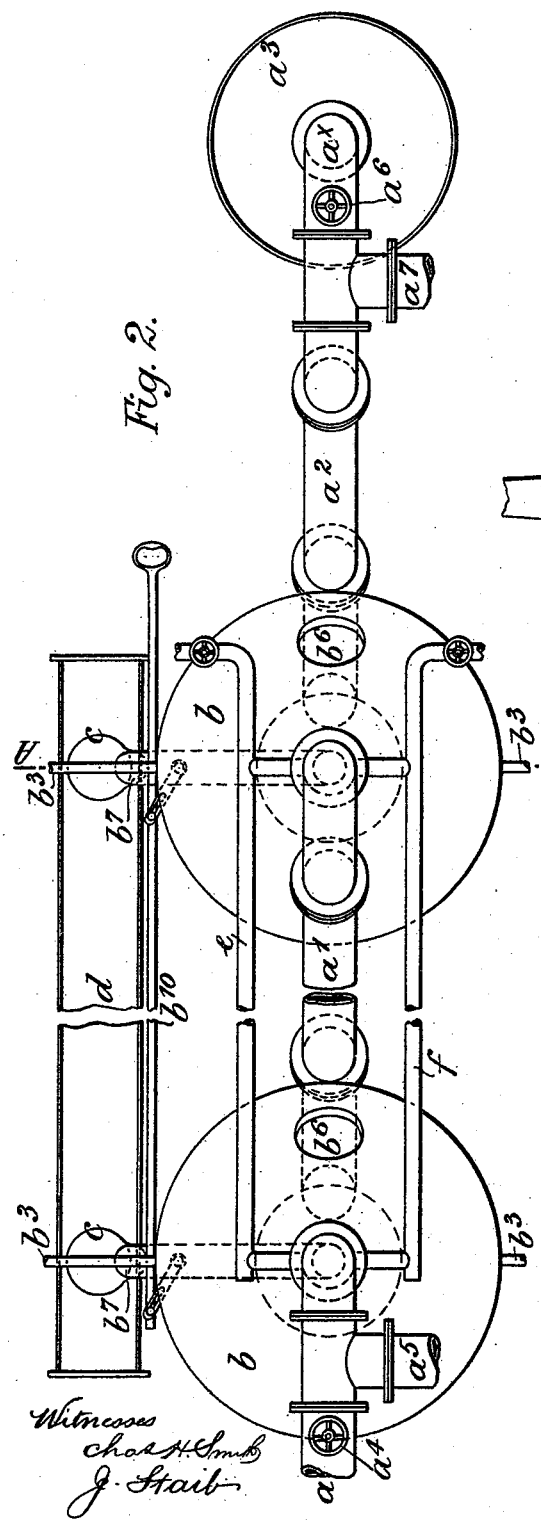
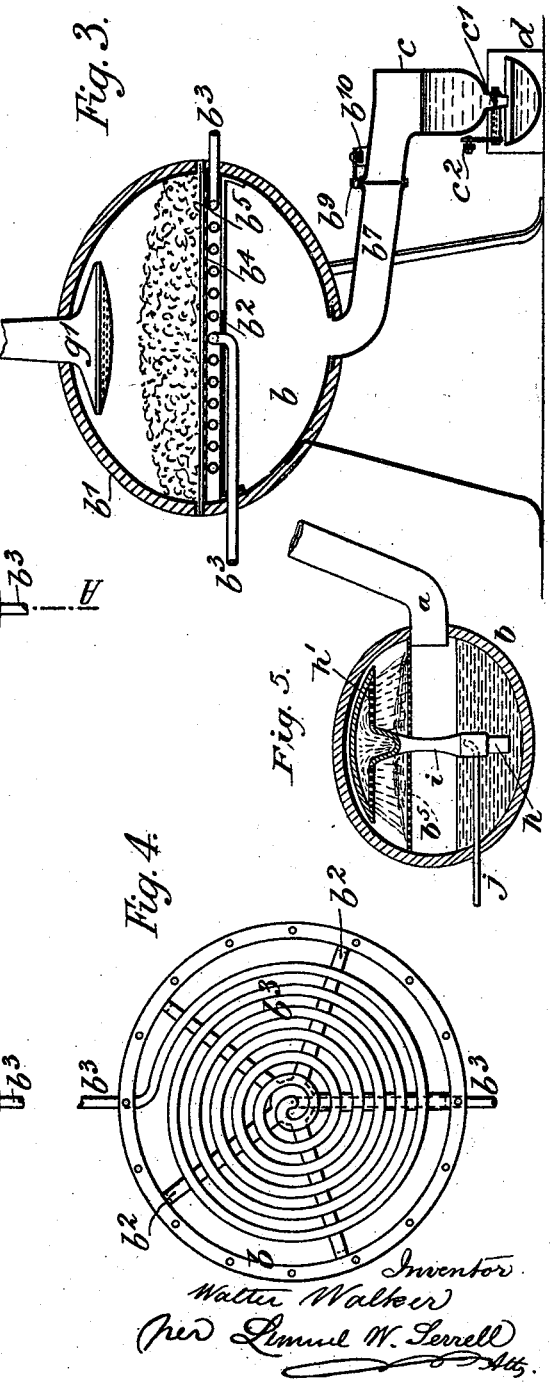

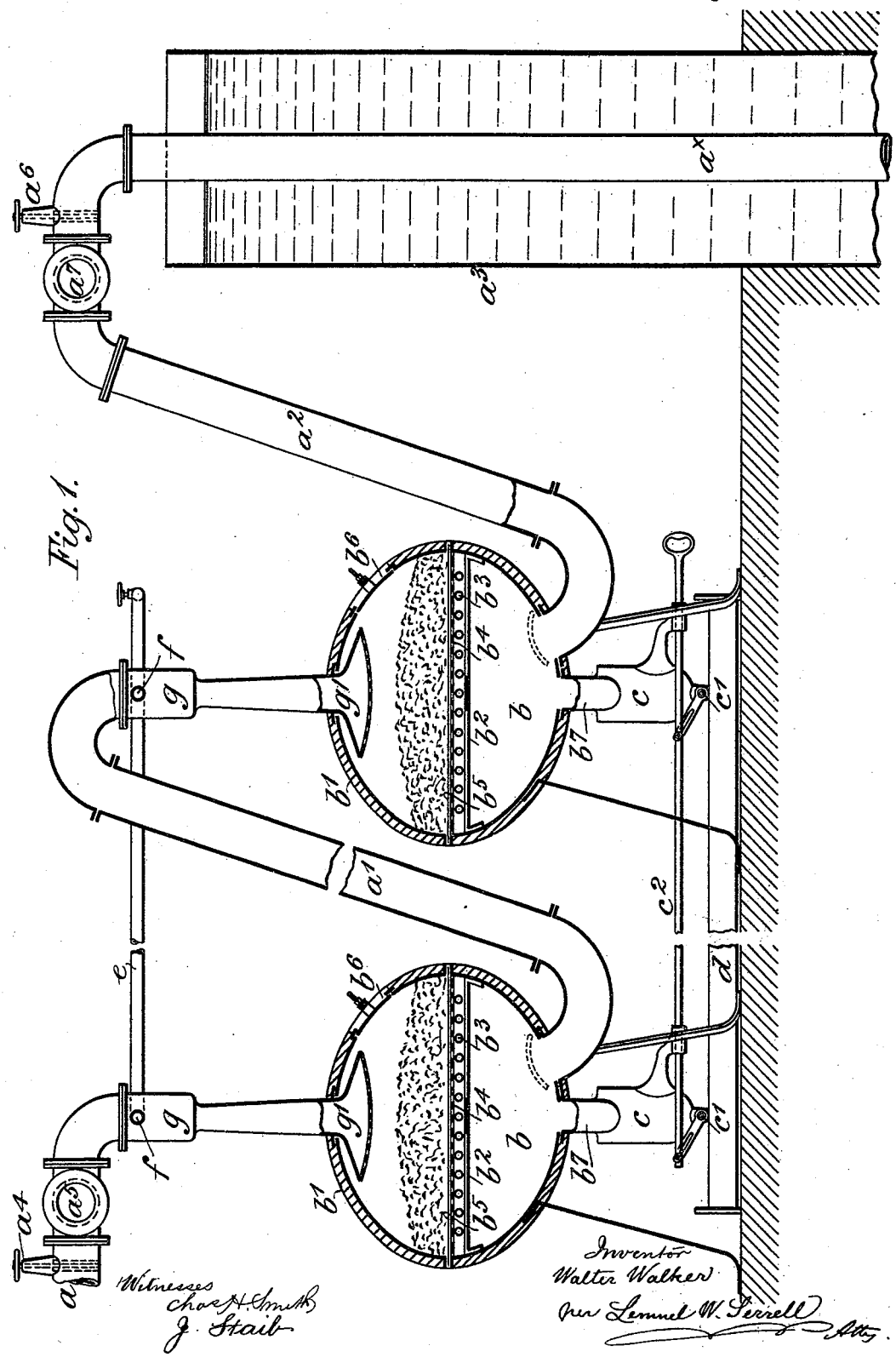

UNITED STATES PATENT OFFICE.

WALTER WALKER, OF LONDON, ASSIGNOR TO DAN RYLANDS, LIMITED, OF BARNSLEY, ENGLAND.

PROCESS OF AND APPARATUS FOR RECOVERING CARBON DIOXIDE.

SPECIFICATION forming part of Letters Patent No. 496,546, dated May 2, 1893.

Application filed April 15, 1892. Serial No. 429,243. (No model.)

*To all whom it may concern:*

Be it known that I, WALTER WALKER, a subject of the Queen of Great Britain and Ireland, residing at London, England, have invented a certain new and Improved Process of Recovering Carbonic-Acid Gas from Lime-Kilns, Furnaces, and other Sources and Apparatus Therefor, of which the following is a full, clear, and exact description.

My invention relates to an improved process of and apparatus for recovering, at a comparatively small cost, carbonic acid gas in a pure state from the gases of lime kilns, furnaces, and other sources, by the use of a suitable carbonate as the collecting and purifying agent. By preference I use carbonate of soda, but if advisable I may use carbonate of potassium, or any other carbonate which may be found suitable to obtain the required result. I prefer to use the carbonates in the form of crystals, but they may be used either in solution, or in a paste, or in an anhydrous or uncrystallized form, with or without mechanical agitation. Any close-topped gas-fired kiln will answer my purpose, but I would prefer one fired with water gas in order to reduce the nitrogen in the gases to a minimum. And in order that my invention may be readily understood, I will describe the same fully with reference to the annexed drawings.

Figure 1 is a sectional elevation; Fig. 2 a plan; and Fig. 3 a vertical cross section on the line A, A, of Fig. 2, of apparatus I prefer to employ in carrying out my improved process. Fig. 4 is a plan of one of the retorts, its cover or upper portion having been removed, and Fig. 5 is a section illustrating a modification.

In the drawings two retorts only are shown, viz: the first and the last of a series, but it will of course be understood that, in practice, any suitable number can be employed.

The gases, from which pure carbonic acid is to be recovered, having been previously washed, are conducted, by means of the inlet pipe $a$, to the first of the series of retorts $b$. Each of these retorts may advantageously consist of a cast iron vessel formed in halves which are flanged and bolted together, and covered with any suitable material $b'$ for preventing radiation of heat. Within each retort is a frame $b^2$ upon which rests a coil of piping $b^3$, and above this piping is a perforated shelf $b^4$, whose upper surface is covered with a filter cloth $b^5$. This cloth may be of slightly larger diameter than the interior of the retort so as to permit of its edges being nipped between the flanges when the halves of the retort are bolted together, thereby enabling the filter cloth to be retained in position. The carbonate of soda, or other carbonate employed, which, as before stated, is preferably in crystalline form, is placed into the retorts, through a man hole $b^6$, and is heaped upon the filter cloth. The retorts are connected by means of pipes $a'$, the lower portion of the retort being in communication with the upper portion of the next, and so on throughout the series until the last retort is reached. This last retort is, by means of a pipe $a^2$, in communication with a long tube $a^x$ which dips into and extends almost to the bottom of a tank $a^3$ containing a column of water. When the inlet valve $a^4$ is opened the gases are free to pass into the retorts, and by means of a force pump, connected to the inlet pipe at $a^5$, said gases are forced into and through all the retorts in succession. The before mentioned tube $a^x$ is provided with a valve $a^6$ which, when the force pump is set to work, is opened so as to put said tube $a^x$ into communication with the retorts; the column of water in the tank $a^3$ then serves as a regulator for preventing the pressure, produced by forcing the gases into the retorts, from becoming excessive. Most of the carbonic acid contained in the impure gases, as these pass through the series of retorts, comes into intimate contact with the carbonate crystals and is absorbed by them, and they are thereby converted into bicarbonate of soda. Any of the carbonic acid which was not taken up by the crystals, and most of the nitrogen, or other impurities, which existed in the gases, will have escaped through suitable valves to a chimney, but any nitrogen, or other impurities, which may have remained within the retorts in a gaseous condition, will, after the valve $a^4$ is closed and the current of gas cut off, be expelled either by forcing through the retorts pure carbonic acid, from a reservoir of the same, or, after the vacuum pumps are started, by allowing the first carbonic acid gas, given off from the bicarbonate, to pass through into the chimney flue instead of into the gas holder and carry all nitrogen or impurities with it. The nitrogen, &c., having been entirely removed, steam, or hot water, is admitted to the coils of piping $b^3$, and the temperature within the retorts is thereby raised to about 170° Fahrenheit, which will cause the bicarbonate to give off the pure carbonic acid it had previously collected from the impure gases coming from the lime kilns, or elsewhere. An aspirator connected to the pipe $a^\times$, at $a^7$, is then set in operation whereby the pure carbonic acid is withdrawn from the retorts and led into a suitable gas holder. The saturated solution which the carbonate crystals part with in the process trickles through the filter cloth $b^5$ and falls into the lower portion of the retorts whence it finds its way down the inclined pipe $b^7$ into a chamber $c$ with which each retort is provided, and from this chamber it can be allowed to flow into a trough $d$ where it is permitted to remain until the crystals reform, when they can be removed and be used over again. The chambers $c$, as well as the inclined pipes $b^7$, are respectively furnished with valves $b^9$ and $c'$, each set being arranged to be operated simultaneously by means of their respective rods $b^{10}$ and $c^2$ extending from end to end of the series. The ends of the pipes $a'$ and $a^2$ may be provided with guards as shown by dotted lines to prevent the bicarbonate solution passing into them. As soon as all the carbonic acid has been withdrawn from the retorts, the steam, or hot water, circulating in the coils of piping $b^3$ is shut off and, if desirable, cold water may then be circulated through these coils so as to reduce the temperature in the retorts to about 70° Fahrenheit. Water, or steam, coming through the pipe $e$, is next admitted to the retorts through the rose $g'$ in the form of a spray, by means of the jet apparatus $g$, with which each retort is provided; the said jet apparatus being operated by steam entering through the pipe $f$. The carbonate is thus kept in a crystalline state and is ready to again collect and recover the carbonic acid from the gases when these latter are admitted to the retorts during a fresh operation. It will thus be seen that, according to my process of recovering carbonic acid, the carbonate crystals are not wasted, but are available for use over and over again.

Instead of allowing the saturated solution to flow into the chamber $c$, as above explained, I can, if preferred, dispense with these chambers and allow the solution to collect in the space at the bottom of the retorts as shown in Fig. 5, and employ a pipe $h$, extending through the carbonate crystals and dipping into the solution. By passing gas under pressure through the pipe $j$, and an ejector $h$, the solution can be forced back into the upper part of the retort by the pipe $h$, and be caused to fall upon the carbonate in the form of a spray, or otherwise; and if necessary I could supply a little added water, or steam, so as to keep the carbonate in a crystalline state. Or to avoid the alteration in temperature, as above stated, I may maintain the retorts at a uniform temperature and pump the gases into them under pressure, and afterward exhaust such gases by the pump, the pressure and vacuum of the pump being chosen suitably and preferably being about equal. Or I may use both less pressure and vacuum, and change the temperature of the retorts somewhat, having the lower temperature and pressure working together when collecting the carbonic acid gas, and the higher temperature and vacuum working together when giving it off. Or I may allow the carbonate to take up the carbonic acid at the natural low temperature, using pressure from the pump to help it, and allow it to give off the carbonic acid at the natural high temperature using suction from the pump to help it.

As I only require comparatively low temperatures, I can use the waste heat of boiler furnaces, or steam, or hot water, for heating the retorts.

The carbonic acid gas recovered according to my process can be compressed in cylinders for sale to mineral water manufacturers, or others, at a much less cost than that at which it is now produced by them.

I claim as my invention—

1. The method herein specified of obtaining pure carbonic acid gas, consisting in passing the impure carbonic acid gas through retorts containing a suitable solid carbonate for the absorption of the carbonic acid and the production of a bi-carbonate, removing by exhaustion the nitrogen and other gaseous impurities, raising the temperature of the bicarbonate to cause the pure carbonic acid to pass off for use, and supplying water upon the carbonate and removing the solution obtained, substantially as specified.

2. In an apparatus for obtaining pure carbonic acid gas, a series of retorts communicating one with the other, and each containing a perforated shelf, a cover of filter cloth for receiving the carbonate, a coil of piping under each shelf through which steam or water is allowed to circulate to raise the temperature in the retorts or to lower such temperature, saturated solution chambers and connections therefrom to the retorts and a trough for receiving the solution and in which the carbonate crystals re-form and are removed for use, jet apparatus for showering or sprinkling water upon the carbonate, contained in the retorts, and an exhaust pipe for drawing off gaseous impurities, substantially as described.

In witness whereof I have hereunto signed my name in the presence of two subscribing witnesses.

WALTER WALKER.

Witnesses:
G. F. WARREN,
T. F. BARNES.